United States Patent
Dolan et al.

(10) Patent No.: US 11,322,122 B2
(45) Date of Patent: May 3, 2022

(54) MUSICAL ACTIVITY SYSTEM

(71) Applicant: QRS MUSIC TECHNOLOGIES, INC., Seneca, PA (US)

(72) Inventors: Thomas A. Dolan, Hendersonville, TN (US); Jarrod Cook, Pittsburgh, PA (US); Aaron Yost, Seneca, PA (US); Daniel Shirey, Oil City, PA (US); Parker Welch, Oil City, PA (US)

(73) Assignee: QRS MUSIC TECHNOLOGIES, INC., Seneca, PA (US)

( * ) Notice: Subject to any disclaimer, the term of this patent is extended or adjusted under 35 U.S.C. 154(b) by 0 days.

(21) Appl. No.: 16/244,931

(22) Filed: Jan. 10, 2019

(65) Prior Publication Data
US 2019/0213987 A1 Jul. 11, 2019

Related U.S. Application Data

(60) Provisional application No. 62/615,719, filed on Jan. 10, 2018.

(51) Int. Cl.
*G10H 1/00* (2006.01)
*G10G 1/00* (2006.01)
(Continued)

(52) U.S. Cl.
CPC ......... *G10H 1/0008* (2013.01); *G06F 3/0482* (2013.01); *G06N 20/00* (2019.01);
(Continued)

(58) Field of Classification Search
CPC ...... G10H 1/0008; G10H 1/0058; G10G 1/00; G06N 20/00; G06F 3/0482; G06Q 50/01
(Continued)

(56) References Cited

U.S. PATENT DOCUMENTS 4,957,031 A * 9/1990 Kondo ................. G10H 1/0033
84/613
4,993,306 A * 2/1991 Ueta ........................ G10H 1/36
84/462
(Continued)

FOREIGN PATENT DOCUMENTS

EP 3067883 9/2016
EP 3067883 A1 * 9/2016 ............. G10H 3/146
(Continued)

OTHER PUBLICATIONS

Search Report & Written Opinion issued in Int'l Appl. No. PCT/US2019/013075 (2019).

*Primary Examiner* — Christina M Schreiber
(74) *Attorney, Agent, or Firm* — Barnes & Thornburg LLP

(57) ABSTRACT

A system providing a music service platform includes a music controller device, a client device, and a server. The music controller device receives musical data indicative of a music performance by an individual and generates metadata characterizing the musical data. The client device includes a software application that receives the musical data and the metadata from the music controller device and presents a graphical user interface for display on the client device. The graphical user interface includes information related to the musical data and the metadata. The server receives the musical data and the metadata, generates one or more analytics associated with the musical data, and performs one or more data aggregation techniques on the musical data.

13 Claims, 9 Drawing Sheets

(51) Int. Cl.
*G06F 3/0482* (2013.01)
*G06Q 50/00* (2012.01)
*G06N 20/00* (2019.01)

(52) U.S. Cl.
CPC .............. *G06Q 50/01* (2013.01); *G10G 1/00* (2013.01); *G10H 1/0058* (2013.01); *G10H 2210/071* (2013.01); *G10H 2210/076* (2013.01); *G10H 2210/091* (2013.01); *G10H 2220/015* (2013.01); *G10H 2220/091* (2013.01); *G10H 2240/075* (2013.01); *G10H 2240/081* (2013.01); *G10H 2240/101* (2013.01); *G10H 2240/105* (2013.01)

(58) Field of Classification Search
USPC ......................................................... 84/453
See application file for complete search history.

(56) References Cited

U.S. PATENT DOCUMENTS

| | | | | |
|---|---|---|---|---|
| 6,374,260 | B1* | 4/2002 | Hoffert | G10H 1/0058 |
| 7,028,082 | B1* | 4/2006 | Rosenberg | H04H 60/02 |
| | | | | 707/999.104 |
| 8,280,889 | B2* | 10/2012 | Whitman | G06F 16/68 |
| | | | | 707/741 |
| 8,407,224 | B2* | 3/2013 | Bach | G06F 16/68 |
| | | | | 707/737 |
| 9,471,673 | B1* | 10/2016 | Sharifi | G10L 25/54 |
| 9,786,298 | B1* | 10/2017 | Greene | G10L 25/54 |
| 10,474,422 | B1* | 11/2019 | Venti | G06F 16/635 |
| 2003/0167904 | A1* | 9/2003 | Itoh | G10H 1/0033 |
| | | | | 84/609 |
| 2006/0206582 | A1* | 9/2006 | Finn | H04L 67/16 |
| | | | | 709/217 |
| 2007/0163428 | A1* | 7/2007 | Salter | G10H 1/0058 |
| | | | | 84/611 |
| 2008/0271592 | A1* | 11/2008 | Beckford | G10H 3/125 |
| | | | | 84/645 |
| 2009/0056525 | A1* | 3/2009 | Oppenheimber | G06F 16/639 |
| | | | | 84/609 |
| 2009/0164034 | A1* | 6/2009 | Cohen | H04L 65/604 |
| | | | | 700/94 |
| 2009/0254836 | A1* | 10/2009 | Bajrach | G11B 27/031 |
| | | | | 715/745 |
| 2009/0255395 | A1* | 10/2009 | Humphrey | G09B 15/00 |
| | | | | 84/470 R |
| 2010/0250585 | A1* | 9/2010 | Hagg | G06F 16/70 |
| | | | | 707/769 |
| 2010/0257005 | A1* | 10/2010 | Phenner | G06Q 30/04 |
| | | | | 705/68 |
| 2013/0018496 | A1* | 1/2013 | Littlejohn | H04H 60/04 |
| | | | | 700/94 |
| 2013/0074678 | A1* | 3/2013 | Iwadate | G09B 7/02 |
| | | | | 84/470 R |
| 2013/0259211 | A1* | 10/2013 | Vlack | H03M 7/3059 |
| | | | | 379/88.01 |
| 2014/0052282 | A1* | 2/2014 | Balassanian | G10H 7/008 |
| | | | | 700/94 |
| 2014/0129235 | A1* | 5/2014 | Suvanto | G10L 21/06 |
| | | | | 704/276 |
| 2014/0298174 | A1* | 10/2014 | Ikonomov | G06F 3/0484 |
| | | | | 715/719 |
| 2015/0268847 | A1* | 9/2015 | Lane | G06F 16/638 |
| | | | | 715/716 |
| 2015/0302086 | A1* | 10/2015 | Roberts | G06F 16/683 |
| | | | | 707/771 |
| 2015/0319479 | A1* | 11/2015 | Mishra | G06Q 30/0257 |
| | | | | 725/32 |
| 2015/0373455 | A1* | 12/2015 | Donaldson | G10L 25/87 |
| | | | | 381/79 |
| 2016/0086609 | A1* | 3/2016 | Yue | G10L 15/22 |
| | | | | 704/239 |
| 2016/0189249 | A1* | 6/2016 | Meyer | H04L 67/26 |
| | | | | 705/14.66 |
| 2016/0231834 | A1* | 8/2016 | Hardi | H04L 51/10 |
| 2016/0275107 | A1* | 9/2016 | Goodwin | G06K 9/628 |
| 2017/0017729 | A1* | 1/2017 | Jamal-Syed | G06F 16/90335 |
| 2017/0090860 | A1* | 3/2017 | Gehring | G10G 1/00 |
| 2017/0092245 | A1* | 3/2017 | Kozielski | G06F 16/683 |
| 2017/0147830 | A1* | 5/2017 | Park | G06F 21/10 |
| 2017/0228531 | A1* | 8/2017 | Raji | G06F 21/31 |
| 2017/0289202 | A1* | 10/2017 | Krasadakis | H04L 65/60 |
| 2018/0053261 | A1* | 2/2018 | Hershey | G06Q 50/01 |
| 2018/0061382 | A1* | 3/2018 | Summers | G10H 1/0008 |
| 2018/0130469 | A1* | 5/2018 | Gruenstein | G10L 15/08 |
| 2018/0137845 | A1* | 5/2018 | Prokop | G10H 7/00 |
| 2018/0139268 | A1* | 5/2018 | Fuzell-Casey | G06F 16/64 |
| 2018/0174559 | A1* | 6/2018 | Elson | H04N 7/15 |
| 2018/0233119 | A1* | 8/2018 | Patti | H04L 67/38 |
| 2018/0260481 | A1* | 9/2018 | Rathod | H04L 63/102 |
| 2019/0141079 | A1* | 5/2019 | Vidas | H04L 63/20 |
| 2019/0147849 | A1* | 5/2019 | Talwar | G06F 40/56 |
| | | | | 704/258 |
| 2019/0213987 | A1* | 7/2019 | Dolan | G10H 1/0008 |
| 2019/0213988 | A1* | 7/2019 | Dolan | G10G 1/00 |
| 2019/0213989 | A1* | 7/2019 | Dolan | G06Q 50/01 |
| 2019/0246936 | A1* | 8/2019 | Garten | A61M 21/00 |
| 2019/0272834 | A1* | 9/2019 | Brenner | G10L 19/018 |
| 2020/0019567 | A1* | 1/2020 | Moo | G06N 20/20 |
| 2020/0051460 | A1* | 2/2020 | Bedor | G09B 5/065 |
| 2020/0168192 | A1* | 5/2020 | Silverstein | G10L 25/15 |

FOREIGN PATENT DOCUMENTS

| | | | |
|---|---|---|---|
| WO | 2015/085092 | 6/2015 | |
| WO | WO-2015085092 A1 * | 6/2015 | ............ H04L 67/10 |

* cited by examiner

MUSICAL ACTIVITY SYSTEM

CROSS-REFERENCE TO RELATED APPLICATIONS

The present application claims the benefit of U.S. Provisional Patent Application No. 62/615,719, filed Jan. 10, 2018. The disclosure set forth in the referenced application is incorporated herein by reference in its entirety.

FIELD

The present disclosure relates to music technology, and more specifically, to a system for tracking and analyzing musical activity including a mobile music controller device.

BACKGROUND

Various technologies allow music performers (e.g., professional musicians, student musicians, amateur musicians, and the like) to track and record performances. For example, a keyboardist may record a practice session by connecting an electronic keyboard to a computing device and playing music on the keyboard. Computer software may capture the performance and output a variety of files, such as audio output, music data (e.g., Music Instrument Digital Instrument (MIDI)-formatted data), and the like.

However, current equipment may be impractical or insufficient for a music performer. For example, a traveling music performer may wish to track a progression of a performance of a musical piece but lack equipment or software to adequately capture the performance (e.g., travel constraints may prohibit the performer from transporting suitable recording equipment). As another example, existing software may be inadequate in guiding an individual (e.g., a music student) in becoming more proficient in a given musical instrument. That is, some software may merely provide playback of a recorded practice session to a student, which offers limited guidance.

SUMMARY

Embodiments presented herein disclose a system for providing a music service platform. The system includes a music controller device, a client device, and a server. The music controller device receives musical data indicative of a music performance by an individual and generates metadata characterizing the musical data. The client device includes a software application that receives the musical data and the metadata from the music controller device and presents a graphical user interface for display on the client device. The graphical user interface includes information related to the musical data and the metadata. The server receives the musical data and the metadata, generates one or more analytics associated with the musical data, and performs one or more data aggregation techniques on the musical data.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
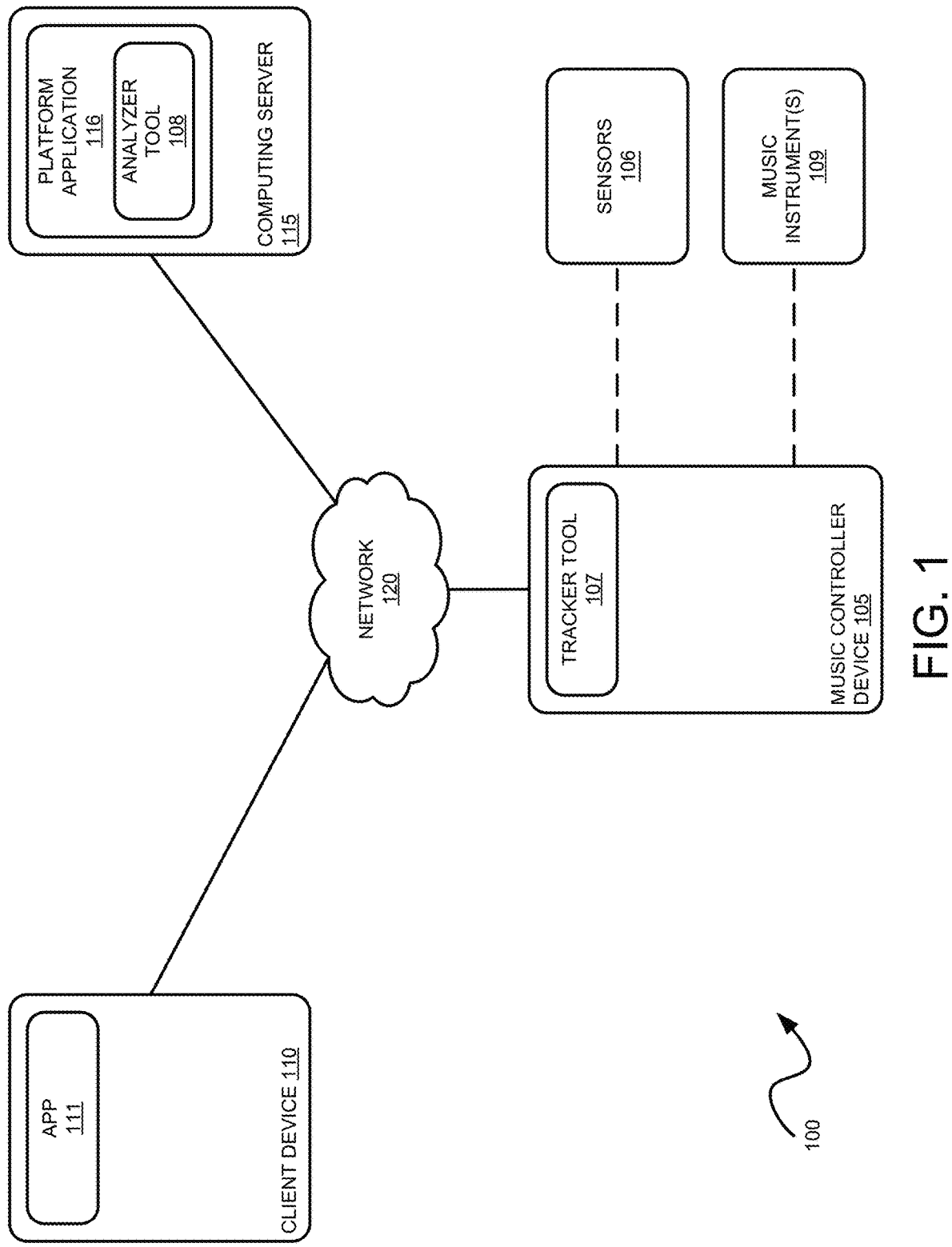
FIG. 1 illustrates a system environment in which a music controller device operates, according to an example embodiment.

FIG. 1 illustrates an example environment 100, according to an example embodiment. As shown, the environment 100 includes a music controller device 105, a client device 110, and a computing server 115, each interconnected via a network 120 (e.g., the Internet). The environment 100 may correspond to a system representative of a music service platform.

In an example embodiment, the music controller device 105 is representative of a mobile controller and tracker device that tracks and stores music activity, converts the music activity to various formats (e.g., audio formats, notation formats, musical interface formats, etc.), and generates analytics of music activity, e.g., on behalf of a user (e.g., a musician, student, hobbyist, and so on). Music activity may include audio input from music instruments 109 connected with the music controller device 105 (e.g., electronic keyboards, synthesizers, guitars, etc.) through an electronic communications interface, such as MIDI (Musical Instrument Digital Interface), audio input from music instruments/devices 109 recorded by audio capture components (e.g., microphones, audio recorder devices, etc.) coupled with the music controller device 105, digital audio input, notation software activity, and the like. The music controller device 105 provides a variety of hardware components, such as speaker components, ports for connecting peripheral devices (e.g., Universal Serial Bus (USB) ports), I/O interface ports (e.g., MicroSD ports, microphones, Bluetooth, MIDI and audio, WiFi audio line in/out, etc.), metronome components, and the like. The music controller device 105 is configured to support both wireless and wired connections to various external hardware, such as sensors 108 (e.g., to monitor metrics such as heart-rate, instrumental movement, muscle movement, and the like). The music controller device 105 also provides a variety of software components for capturing audio (e.g., music performances), storing the audio and other data thereon, and transmitting the audio and other data to a music service platform (e.g., a platform application 116 executing on the computing server 115) or devices associated with a given user.

The client device 110 may be embodied as a physical computer (e.g., a desktop computer, laptop computer, or mobile device such as a tablet, smartphone, etc.) or a virtual computing instance in a cloud network. Illustratively, the client device 110 includes an app 111, which is representative of a graphical user interface for a user of the music controller device 105. The app 111 may be wirelessly connected to the music controller device 105, e.g., via a Wi-Fi connection (such as over the network 120) or a Bluetooth connection. The app 111 may also be part of a music service platform, where the app 111 may transmit musical data and user inputs to the platform application 116. The app 111 may upload and retrieve data to and from (respectively) either the music controller device 105 directly or from a platform service running on the cloud (e.g., platform application 116 executing on the computing server 115). The app 111 may provide playback and local analysis for data received from the music controller device 105 (e.g., audio data representative of a performance using a music instrument 109). The app 111 may establish a wireless connection (e.g., a Bluetooth connection) with the platform application 116 (and/or the music controller device 105) to enable the app 111 to receive, via the wireless connection, performance data, music tracker data, and analytics from the music controller device 105. The GUI of the app 111 may also allow a user to provide inputs to associate with musical data. For example, the GUI may provide one or more data fields for categorizing musical data representative of a performance.

As shown, the music controller device 105 includes a tracker tool 107. In an example embodiment, the tracker tool 107 receives audio input representative to a musical performance and generates (and/or receives) metadata categorizing the musical performance. The tracker tool 107 may also receive additional input from a user to assist in categorizing the musical performance. For example, once received, the tracker tool 107 may assign a distinct identifier to the audio input and tags associated with the music performance, such as the date of performance, time of day of the performance, length of the performance, genre of the performance, a musical instrument (or instruments) connected with the music controller device 105 or otherwise used during the performance, a type of performance (e.g., whether the performance is a rehearsal, a practice, studio recording, demo, and the like), and the like. The distinct identifier may also serve to secure the audio input (e.g., as a watermark identifying an underlying individual captured performing in the audio input). The tracker tool 107 may also receive data obtained from sensors 106 connected with the music controller device 105 (e.g., cameras, heart rate monitors, brain wave sensors, optical sensors, etc.). The tracker tool 107 is also configured to transmit, via the network 120 over a wired or wireless connection, the audio input and associated metadata to a user device (e.g., to an app 111 executing on the client device 110) or the music service platform (e.g., platform application 116).

For example, the tracker tool 107 receives audio input representative to a musical performance and generates metadata categorizing the musical performance. The tracker tool 107 may also receive additional input from a user (e.g., via the app 111) to assist in categorizing the musical performance. Once received, the tracker tool 107 may assign a distinct identifier to the audio input, which is also referred to herein as a piece. The tracker tool 107 may assign tags over a timeline of the piece, such as the date of performance, time of day of the performance, and the instrument used (e.g., as connected to the music controller device 105), an identifier associated with a user of a corresponding account on the music service platform, and the like. Further, the tracker tool 107 may generate additional variables, such as length of a given performance, genre of the performance, a musical instrument (or instruments) connected with the music controller device 105 or otherwise used during the performance, and the like. In addition, the tracker tool 107 may also receive data obtained from sensors 106 connected with the music controller device 105 (e.g., heart rate monitors, brain wave sensors, optical sensors, etc.). The tracker tool 107 is also configured to transmit, via the network 120 over a wired or wireless connection, the audio input and associated metadata to a client device 110 (e.g., to the app 111) or to the platform application 116 on the cloud (e.g., executing on a computing server 115).

The computing server 115 may be representative of a physical computer (e.g., a desktop computer, workstation computer, laptop or tablet computer, etc.) or a virtual computing instance in a cloud network. In some embodiments, the computer server 115 may be a cloud resource providing a software platform for the music controller device 105. More particularly, as shown, the computing server 115 includes a platform application 116. The computing server 115 may be one of many servers providing the platform application 116. The platform application 116 is representative of software providing a music service platform that interfaces with the music controller device 105 and the app 111. For example, the platform application 116 may obtain musical data automatically from a music controller device 105 upon completion of a performance recording by the music controller device 105. The platform application 116 may receive data from a given music controller device 105 (e.g., audio data) or app 111 on a client device 110. The platform application 116 may then perform various actions on the data, such as tracking, analytics, and the like. For instance, the platform application 116 may perform tracking functions generally performed by the tracker tool 107, such as receiving musical data from a given music controller device 105, generating metadata associated with the musical data, and generate analytics based identified correlations. The platform application 116 also aggregates musical data of multiple users to provide scalable analytics for a large user and instrument base.

In addition, as shown, the platform application 116 includes an analyzer tool 108. In an example embodiment, the analyzer tool 108 may identify correlations in captured musical data (e.g., audio data, metadata associated with the audio data, and the like) and generate analytics based on the correlations. For example, assume the analyzer tool 108 obtains musical data representative of a performance of a piece over a weeklong period. The analyzer tool 108 may identify patterns across each performance of the piece captured over the weeklong period, such as timing patterns, a tendency for playing at a particular tempo, and the like. To do so, for example, the analyzer tool 108 may evaluate metadata associated with each particular performance. The analyzer tool 108 may store the analytics thereon. Further, the analyzer tool 108 may transmit, via the network 120 over a wired or wireless connection, the generated analytics to the app 111 or the platform application 116. Once generated, the platform application 116 may input the analytics with data aggregation services to generate global analytics of an individual's musical data with other users of the music service platform.

Further still, the platform application 116 may provide an automated copyright protection service that allows an individual to automatically register a copyright in musical data received from a music controller device 105. For instance, a music controller device 105 associated with a given user may include functionality to upload a copyright request to the platform application 116 for musical data recorded on the platform. The platform application 116 may receive the request and process the request (e.g., by generating a formal request for copyright protection on the musical data on behalf of the individual upon further verification of the musical data). Once successful, the platform application 116 may send a confirmation to the user.

Figure 2:
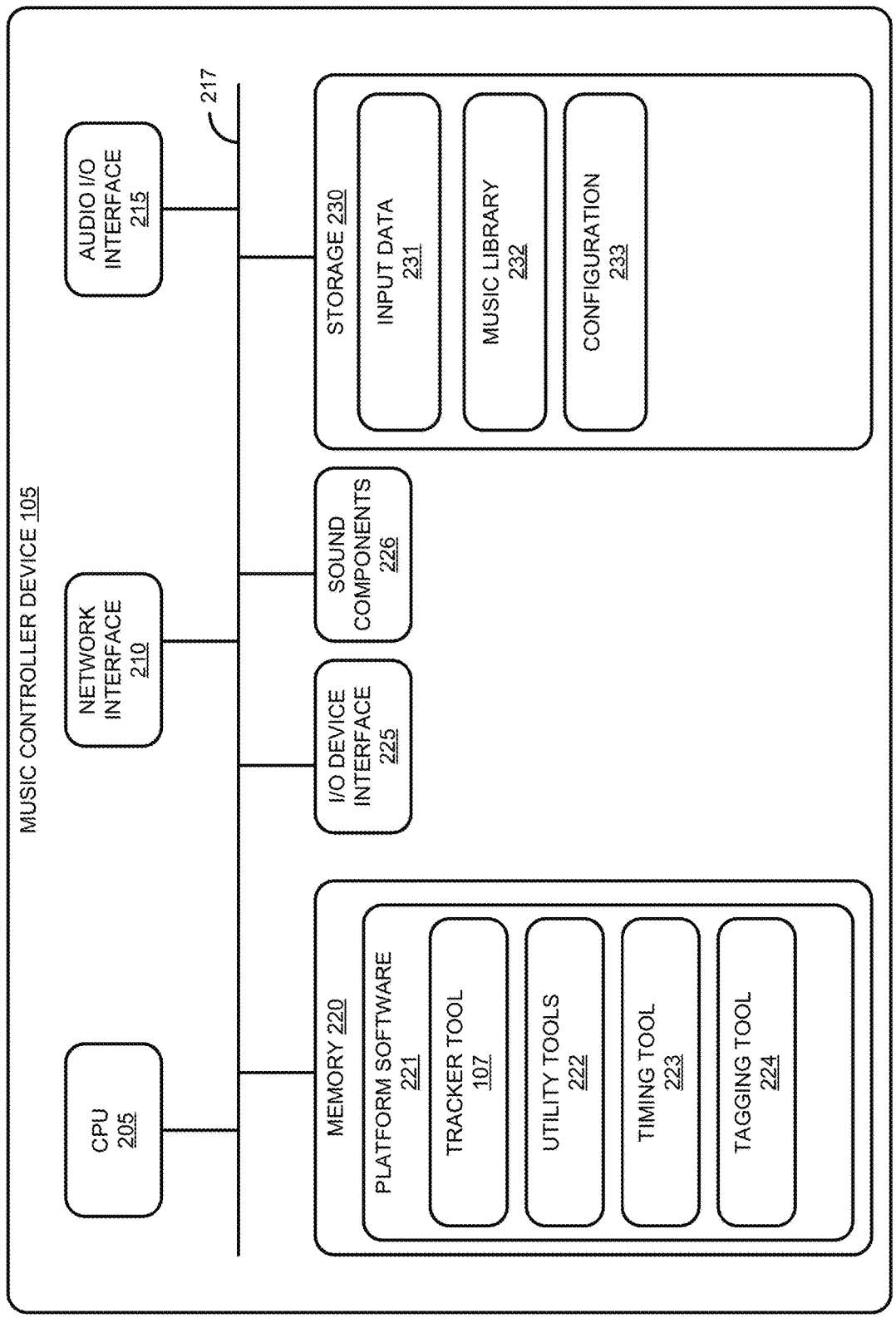
FIG. 2 further illustrates the music controller device described relative to FIG. 1, according to an example embodiment.

FIG. 2 further illustrates the music controller device 105, according to an example embodiment. As shown, the music controller device 105 includes a central processing unit (CPU) 205, a network interface 210, an audio input/output (I/O) interface 215, a memory 220, an I/O device interface 225, sound components 226, and a storage 230, each interconnected via a hardware bus 217. In practice, an actual music controller device 105 will include a variety of additional hardware components not shown. For example, the music controller device 105 includes MIDI I/O and wireless communication I/O interfaces that facilitate communication with MIDI and wireless devices, respectively. As another example, the music controller device 105 may include hardware, software, and/or device circuitry for recording and displaying image and video data (e.g., camera hardware, video processing circuitry, and the like).

The CPU 205 retrieves and executes programming instructions stored in the memory 220. Similarly, the CPU 205 stores and retrieves input data 231 and data from a music library 232 residing in the storage 230. The hardware bus 217 is used to transmit instructions and data between the CPU 205, storage 230, network interface 210, audio I/O interface 215, I/O device interface 225, and the memory 230. CPU 205 is included to be representative of a single CPU, multiple CPUs, a single CPU having multiple processing cores, and the like. The memory 220 is generally included to be representative of memory and storage on a portable device, e.g., DDR and flash memory spaces. The audio I/O interface 215 communicates audio-in and -out data captured by audio devices connecting with the interface 215 via one or more ports to and from the music controller device 105. The I/O device interface 225 communicates data transmitted via one or more ports (e.g., USB ports, serial ports, etc.) for peripheral devices. Peripheral devices can include keyboard, mouse, wearable devices (e.g., heart rate monitors, breath detectors, movement monitors, smartwatches, and the like). The sound components 226 may be embodied as any hardware, software, or other device circuitry used to process audio input and to generate output signals representing audio. For example, the sound components 226 may include a sound processor and a sound memory used to receive audio data and further process the audio data (e.g., using a variety of sound encoding and decoding protocols, etc.).

The network interface 210 may be embodied as any hardware, software, or circuitry used to connect the music controller device 105 over a network, e.g., to communicate with the client device 110 and the computing server 115. In addition, the network interface 210 supports peer-to-peer connection (e.g., with other music controller devices 105) and long distance communication protocols to communicate with other networked devices.

Illustratively, the memory 220 includes the platform software 221. The platform software 221 includes various application programming interfaces (APIs) used for communication with the app 111, platform application 116, and third-party applications as part of the music service platform. The platform software 221 also includes various software tools and widgets used in operation of the music controller device 105. For instance, as shown, the platform software 221 includes the tracker tool 107, one or more utility tools 222, a timing tool 223, and a tagging tool 224. As stated, the tracker tool 107 is configured to receive input data 231 and generate metadata categorizing the input data 231 (e.g., user, instrument type, duration of a performance, etc.). The utility tools 222 include an audio component used to adjust an audio configuration of the music controller device 105 (e.g., specified in configuration 233), such as settings relating to audio quality, sample rate, and the like. The utility tools 222 also include a MIDI component used to process MIDI data. The timing tool 223 may determine timestamp data to associate with audio input, such as a time of day in which audio input is created. The tagging tool 224 may assign metadata tags (e.g., identified by the tracker tool 107) to audio input.

Note, the platform software 221 may additional tools, widgets and applications (e.g., third-party applications) not shown in FIG. 2. Such tools, widgets, and applications may be configured to perform other functions associated with the music controller device 105, such as metronome functions, key-tuning functions, and the like.

The storage 230 includes input data 231, a music library 232, and configuration 233. The input data 231 may correspond to audio input received (e.g., from an instrument device connected with the music controller device 105 or from audio recorded via the audio I/O interface 215). The music library 232 may include performances recorded for a user by the music controller device 105. The music library 232 may also include predefined music (e.g., MIDI files, sheet music files, and the like) that may be correlated with audio input performances. Each datum provided in the music library 232 may be assigned metadata tags classified by the tracker tool 107. The configuration 233 provides tunable parameters for settings such as recording settings, tool settings, mode defaults, network configurations, battery functions, storage defaults, and so on.

Figure 3:
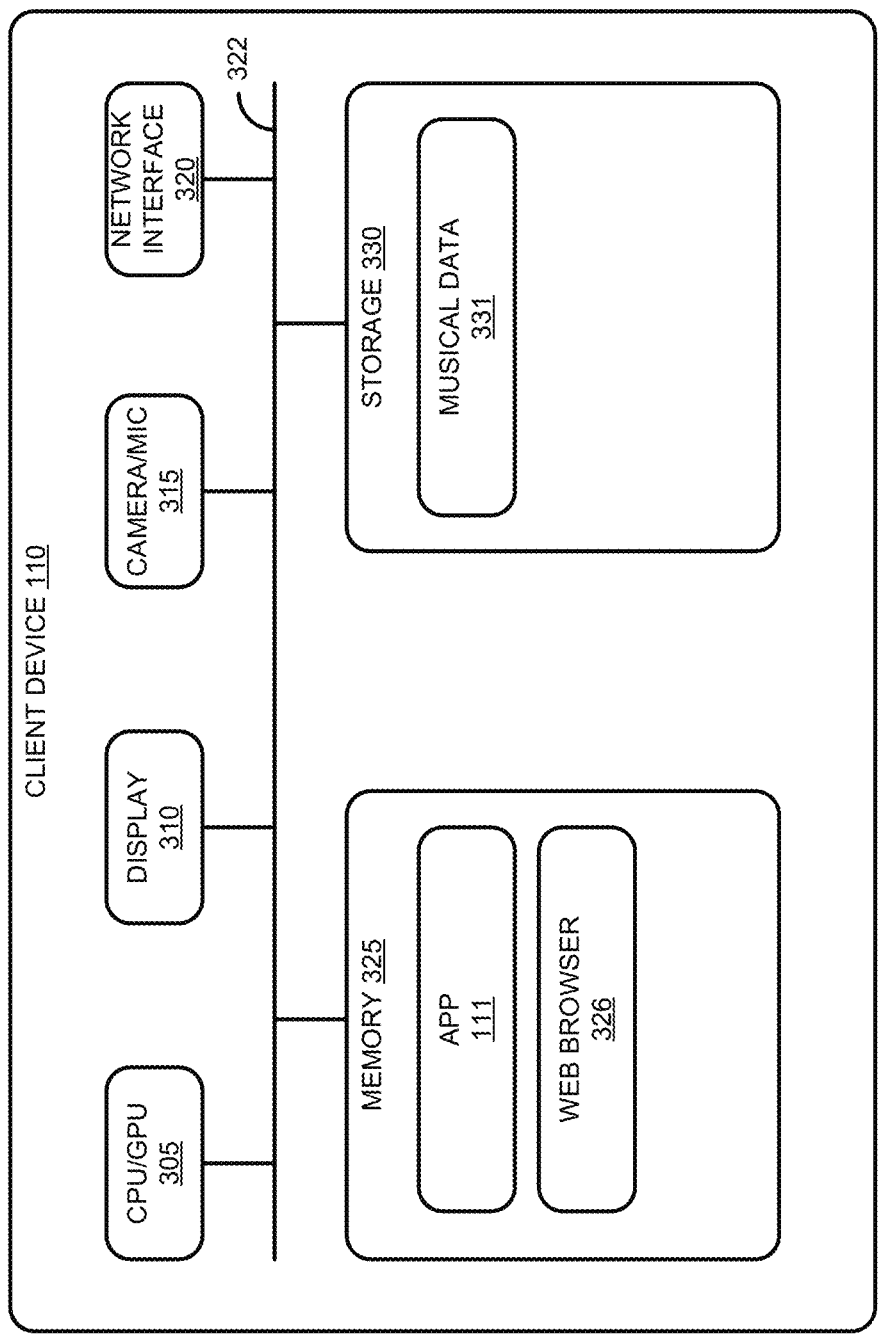
FIG. 3 further illustrates the client device described relative to FIG. 1, according to an example embodiment.

FIG. 3 further illustrates the client device 110, according to an example embodiment. As shown, the client device 110 includes, without limitation, a central processing unit and graphics processing unit (CPU/GPU) 305, a display 310, a camera/microphone 315, a network interface 320, a memory 325, and a storage 330, each interconnected via a hardware bus 322. Of course, an actual client device 110 will include a variety of additional hardware components.

The CPU/GPU 305 retrieves and executes programming instructions stored in the memory 325. Similarly, the CPU/GPU 305 stores and retrieves musical data 331 residing in the storage 330. The hardware bus 322 is used to transmit instructions and data between the CPU/GPU 305, storage 330, network interface 320, and the memory 325. CPU/GPU 305 is included to be representative of a single CPU, multiple CPUs, a single CPU having multiple processing cores, and the like. The memory 325 is generally included to be representative of memory and storage on a mobile device, e.g., DDR and flash memory spaces. The network interface 320 may be embodied as any hardware, software, or circuitry (e.g., a network interface card) used to connect the client device 110 over a network.

Illustratively, the memory 325 includes the app 111. The storage includes musical data 331 indicative of data associated with one or more music performances transmitted over a network from the music controller device 105. The app 111 may receive, from the music controller device 105, the musical data 331 via a wired or wireless connection (e.g., Bluetooth connection, Wi-Fi connection, etc.). In addition, the app 111 may receive, from the platform application 116, additional musical data 331 associated with performance data sent from the music controller device 105 (e.g., metadata generated by the tracker tool 107). For example, the app 111 may receive additional analytics generated by the platform application 116 for a given set of performance data (e.g., a number of performances for a specified piece, average length of the piece as recorded, etc.). Further, the app 111 may present the data to a user via a graphical user interface or a web-based interface (e.g., with the data and web content provided by the platform application 116). In addition, the app 111 may upload musical data 331 (including any generated and assigned metadata tags to the musical data 331) received by the music controller device 105 to the platform application 116.

As shown, the memory 325 also includes a web browser 326. Additionally, or alternatively, the client device 110 may access functionality typically provided by the app 111 (e.g., analytics, graphical user interface data, playback data) remotely via a web service hosted by the music service platform (e.g., via the platform application 116).

Figure 4:
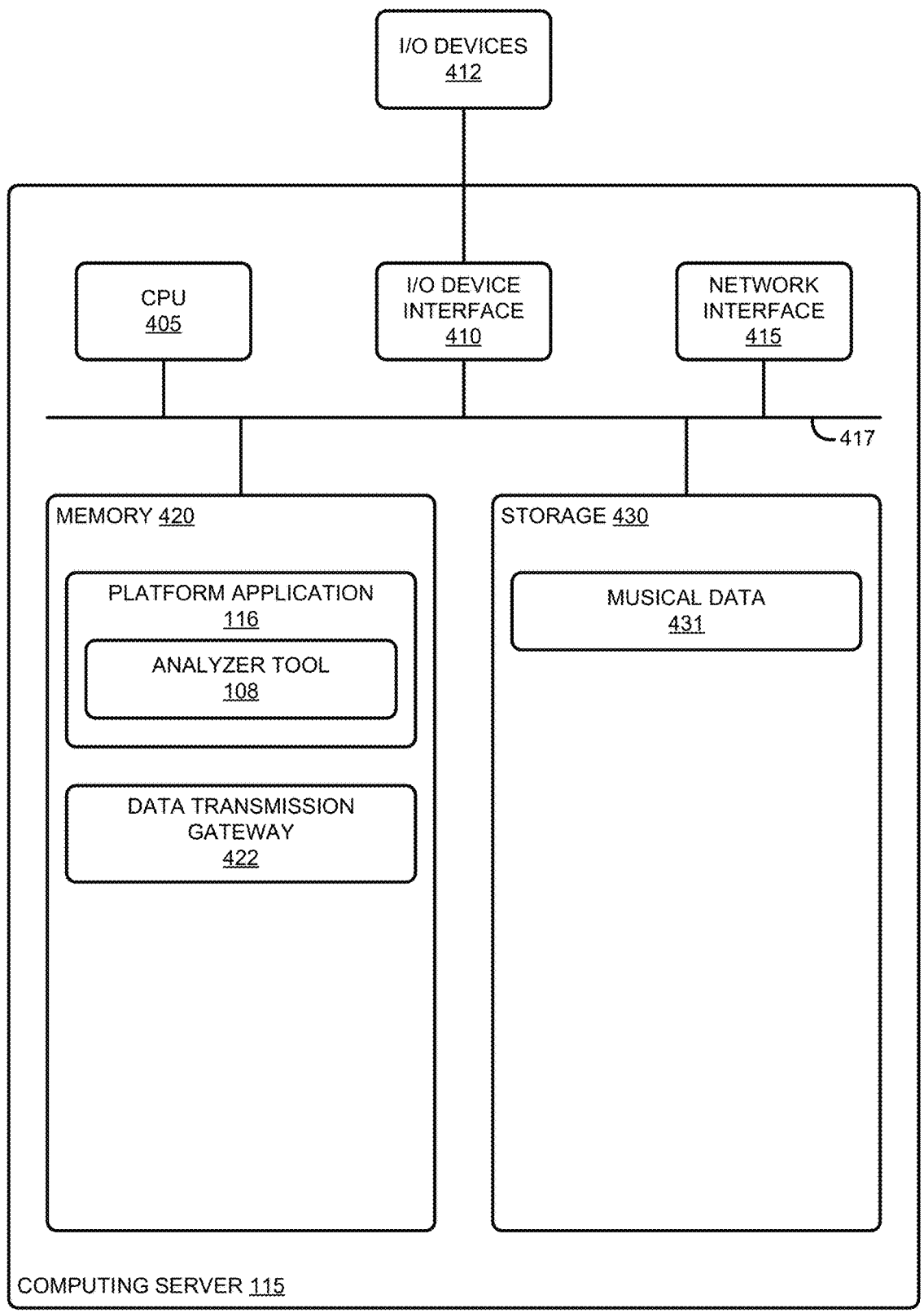
FIG. 4 further illustrates the computing server described relative to FIG. 1, according to an example embodiment.

FIG. 4 further illustrates the computing server 115, according to an example embodiment. As shown, the computing server 115 includes, without limitation, a central processing unit (CPU) 405, an I/O device interface 410, a network interface 415, a memory 420, and a storage 430, each interconnected via an interconnect bus 417. Note, CPU 405 is included to be representative of a single CPU, multiple CPUs, a single CPU having multiple processing cores, and the like. Memory 420 is generally included to be representative of a random access memory. Storage 430 may be a disk drive storage device. Although shown as a single unit, storage 430 may be a combination of fixed and/or removable storage devices, such as fixed disc drives, removable memory cards, or optical storage, network attached storage (NAS), or a storage area network (SAN). The I/O device interface 410 may provide a communications interface between the computing server 115 and I/O devices 412.

Illustratively, the memory 420 includes the platform application 116. The storage 430 includes musical data 431. The platform application 116 receives musical data 431 associated with a given user from a client, such as the app 111 executing on the client device 110 or the music controller device 105. As shown, the platform application includes the analyzer tool 108. The analyzer tool 108 generates analytics based, at least in part, on the metadata associated with the musical data 431 (e.g., as previously tagged by a tracker tool 107 of a corresponding music controller device 105). For example, the analyzer tool 108 may evaluate musical data 431 representative of a user with a corresponding sheet music file to determine deviations of the musical data 431 with the sheet music file. As another example, the analyzer tool 108 may evaluate multiple performances of a musical piece by an individual to identify tendencies of a given individual (e.g., for various metrics, such as tempo, volume, The platform application 116 may also store the musical data 431 by user (or user group). The memory 420 also includes a data transmission gateway 422.

The data transmission gateway 422 is to provide a channel between the computing server 115 and the music controller device 105. Doing so allows the music controller device 105 to communicate with the computing server 115 over a network and enables the music controller device 105 to communicate with other music controller devices 105 in the music service platform. Doing so allows the music controller devices 105 to perform long distance learning techniques using MIDI and other connected musical controller devices 105. The memory 420 may also include additional applications and data used in conjunction with (or separate from) the platform application 116.

Figure 5:
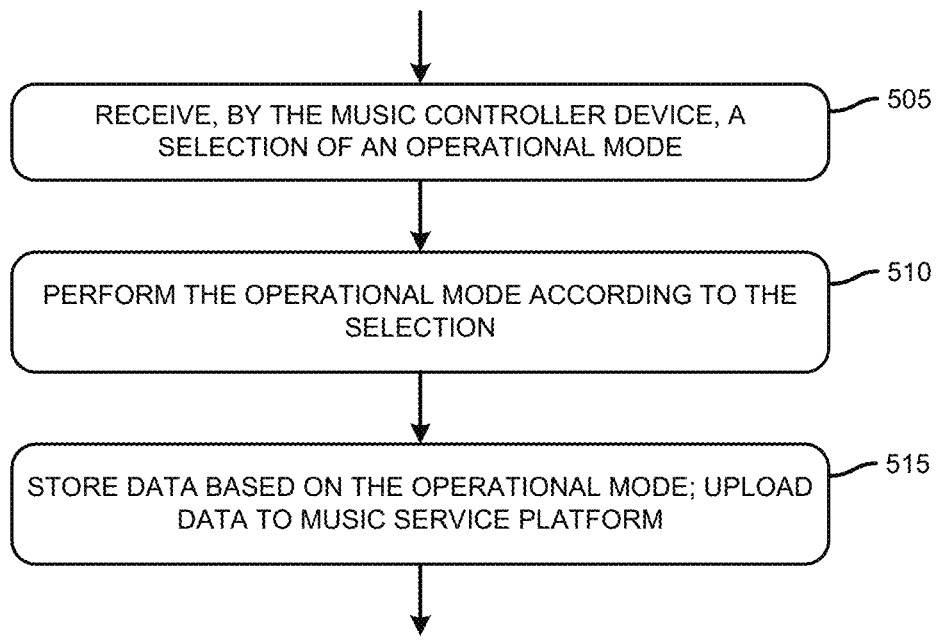
FIG. 5 illustrates an example method for operating a music controller device described relative to FIG. 1, according to an example embodiment.

FIG. 5 illustrates an example method 500 for operating the music controller device 105, according to an example embodiment. At step 505, the music controller device 105 receives a selection of an operational mode. For example, the music controller device 105 may provide one or more operational modes, such as capture, playback, music fingerprint generation, auto-record, and the like. At step 510, the music controller device 105 performs the operational mode according to the selection. For example, assume the selection corresponds to a capture or recording mode. In such a case, the music controller device 105 may activate an on-device microphone (or recording device connected with the music controller device 105) by transmitting an electric signal via the audio I/O interface and record audio data until the microphone is disabled (e.g., by the user). At step 515, the music controller device 105 stores data based on the operational mode. Continuing the previous example, the music controller device 105 may store the captured audio input in a local storage. Particularly, the music controller device 105 may capture the audio input as MIDI data and also capture other inputs based on sensors connected with or part of the music controller device 105, such as biometrics, time, temperature, and the like. The music controller device 105 may store the data thereon. Further, other components of the music controller device 105 may process the audio input. For example, the tracking tool 107 may generate metadata categorizing and describing the input. As another example, assume the selection corresponds to a playback mode. The tracker tool 107, upon completion of a playback of a given set of musical data, may update a playback counter for the musical data. The music controller device 105 may further transmit the data to the app 111 and the platform application 116 for analytics generation. Note, although FIG. 5 depicts receiving selections of operational modes, the music controller device 105 may include preset operational modes, such as auto-record, to eliminate manually starting and stopping a recording.

Figure 6:
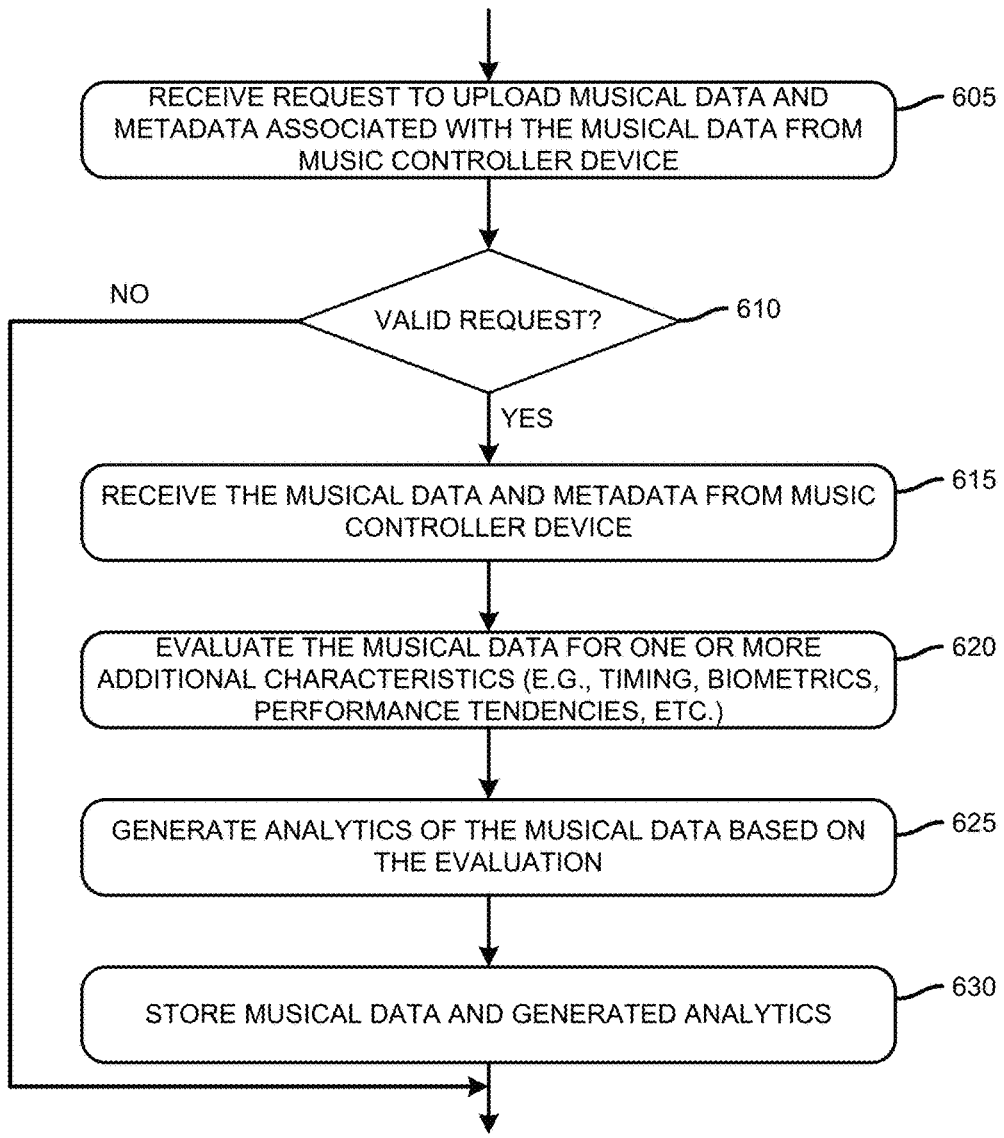
FIG. 6 illustrates an example method for tracking and analyzing musical data, according to an example embodiment.

FIG. 6 illustrates an example method 600 for tracking and analyzing musical data, according to an example embodiment. For example, the platform application 116 may, in operation, perform the steps of method 600. More particularly, the music controller device 105 may automatically transmit data captured thereon to the platform application 116. In turn, the platform application 116 may store the data and perform further analytics on the data. As shown, the method 600 begins at step 605, where the platform application 116 receives a request to upload musical data from the music controller device 105. The musical data may include audio data, sensor data, metadata, and the like associated with a given performance. At step 610, the platform application 116 determines whether the request is valid. For example, the platform application 116 may ensure that the request is properly formatted. If not, the method 600 ends. Otherwise, at step 615, the platform application 116 receives the musical data (e.g., the audio capture and data associated with the audio capture) from the music controller device 105 over a network connection, such as a wireless connection.

At step 620, the platform application 116 evaluates the musical data for one or more characteristics. The characteristics can include timing, biometrics, and the like. The platform application 116 may associate the one or more characteristics to the musical data, e.g., as additional metadata characterizing the musical data. At step 625, the platform application 116 generates analytics for the musical data based on the evaluation. To do so, the platform application 116 may identify correlations between the characteristics determined from the evaluation and other data stored by the platform application 116 for the music controller device 105. The platform application 116 then generates or updates preexisting analytics in predefined categories (e.g., trends, frequency of performance, timing characteristics, and the like). At step 630, the platform application 116 stores the musical data and generated analytics at a storage location, such as a local storage or an external storage server. The platform application 116 may additionally associate the stored musical data and generated analytics with an account of the user on the music service platform. The platform application 116 may thereafter send the musical data on the app 111 associated with the user (and/or to other users having access permissions to the musical data associated with the user), e.g., for display on a client device. Other examples may include providing access to the analytics by third-party applications (e.g., social media services) for posting to a given user profile.

In addition, the platform application 116 may, using various data aggregation techniques, aggregate data (e.g., musical data, analytics, and any other information associated with a user account) associated with a given user with data of other users. Doing so may allow the platform application 116 to generate global analytics for musical data for users.

Figure 7:
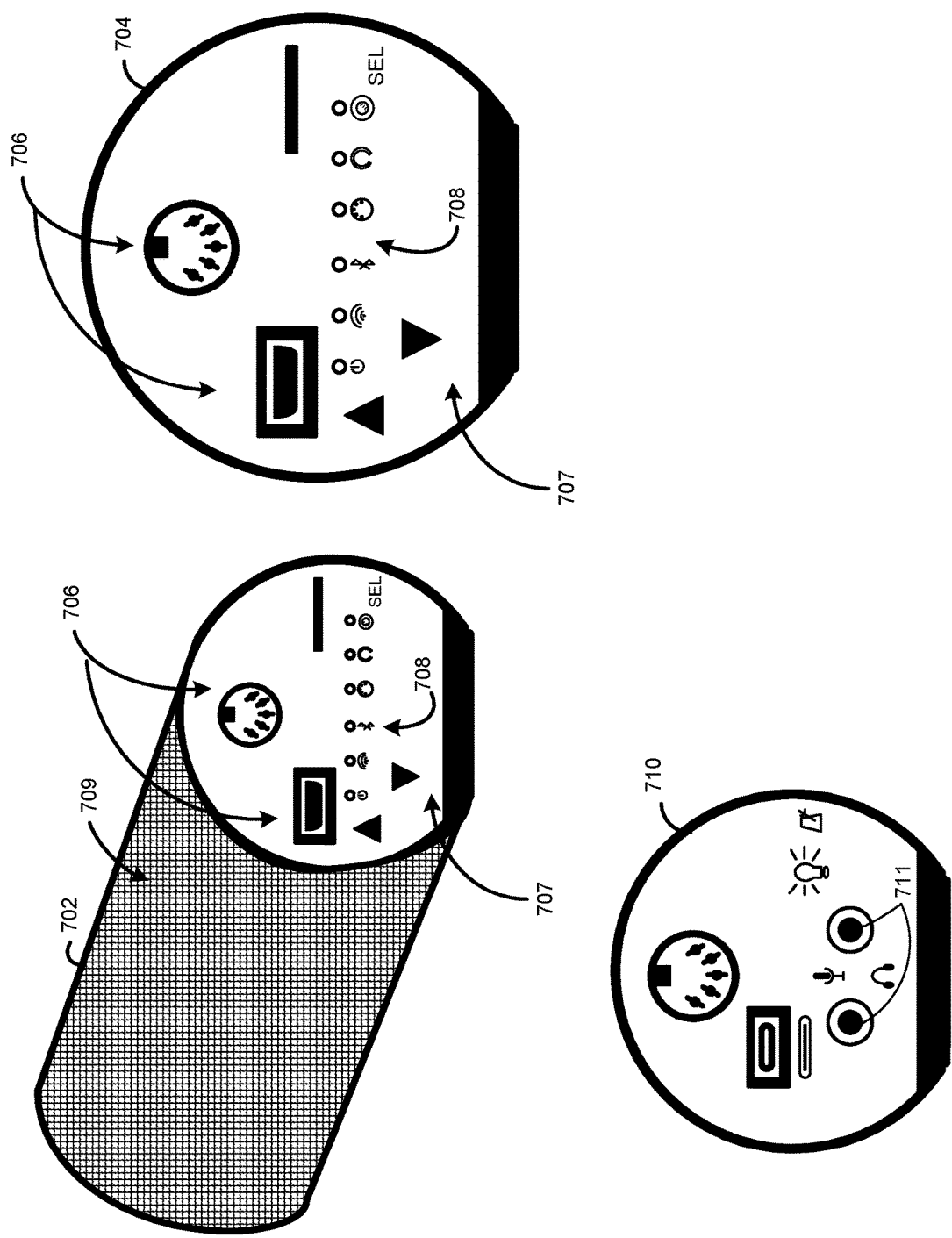
FIG. 7 illustrates example perspective views of the music controller device described relative to FIG. 1.

FIG. 7 illustrates example views 702, 704, and 710 of the music controller device 105. More particularly, view 702 corresponds to a perspective lengthwise view of the music controller device 105, view 704 corresponds to a view of a face of the music controller device 105, and view 710 corresponds to a view of the rear of the music controller device 105. As the views 702, 704, and 710 depict, the music controller device 105 may include ports to receive connectors 706 (e.g., Deutsches Institut für Normung (DIN) connectors, USB connectors, etc.). The music controller device 105 may also provide a slot for storage disks (e.g., microSD) thereon. The music controller device 105 may also include volume controls 707 for adjusting playback. Illustratively, the music controller device 105 may also include one or more indicators 708 displaying features that are enabled or disabled thereon, such as whether the music controller device 105 is in operation, whether network capabilities (e.g., wireless connections) are enabled, whether the music controller device 105 is currently in a recording mode, and so on. The view 702 also depicts indicators 709, which may be associated with instrument tuning components on the music controller device 105. The view 710 depicts receivers 711 line-in and line-out connectors (e.g., for audio input and output devices) and a receiver for a power source to provide power to the music controller device 105.

Figure 8:
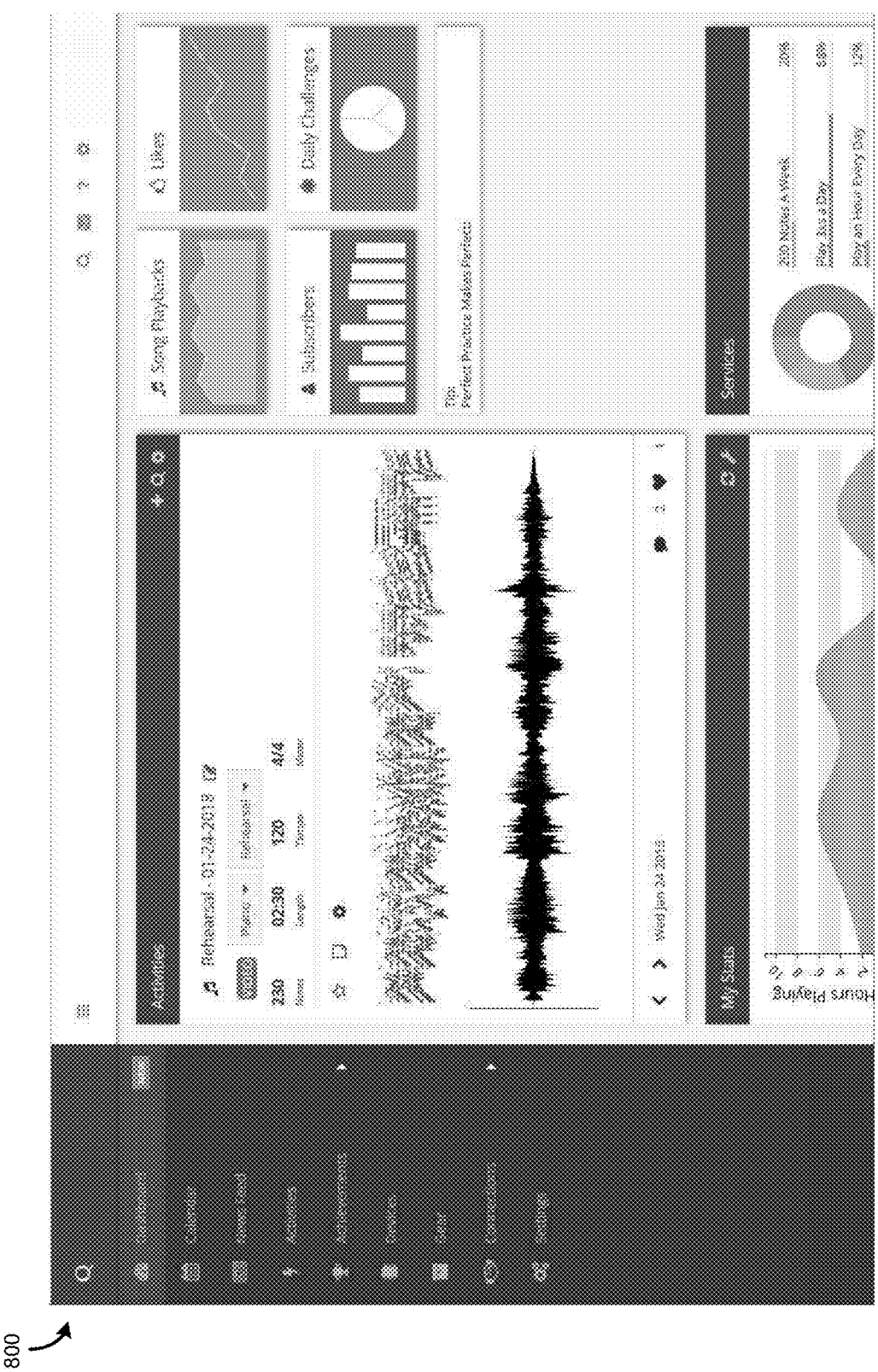
FIG. 8 illustrates an example view of a user interface that may be provided with the client device to communicate with the music controller device and computing server described relative to FIG. 1.

FIG. 8 illustrates an example of a graphical user interface (GUI) 800 provided for the app 111. In some embodiments, the GUI 800 may also be accessible by a web browser on the client device 110 (e.g., as a service provided by the music service platform). Generally, the GUI 800 provides an interface for a user to access activity information (e.g., generated analytics such as performance analytics, usage analytics, and the like) and participate in social media features provided by the music service platform, e.g., managed by the platform application 116. Illustratively, the left-hand portion of the GUI 800 provides a menu displaying various items that a user may select. Upon selection, the GUI 800 may display the corresponding content on the right-hand portion of the GUI 800. For example, as illustrated in GUI 800, the selected item is a dashboard which is used to display various data and analytics related to performances and activity (as provided by musical data sent by a given music controller device 105). For example, the currently displayed dashboard provides an activity window showing information such as an instrument used, a type of performance (e.g., a rehearsal), an amount of notes played, a length of the performance, a tempo at which the piece was played, and the meter in which the piece was played. The activity window also displays waveforms corresponding to audio of the performance.

Other example menu items include a calendar for displaying times and dates at which musical data was performed and/or uploaded to the music service platform, a news feed displaying social media features (e.g., posts indicating that a user associated with the music service platform has uploaded new musical data), activities indicating musical data and other activities being performed by the user, achievements displaying predefined goals that have been realized by a user, music controller devices 105 (or other devices) associated with a user, gear such as wearable devices associated with a user, social media relationships with other users of the music service platform, and configuration settings.

Figure 9:
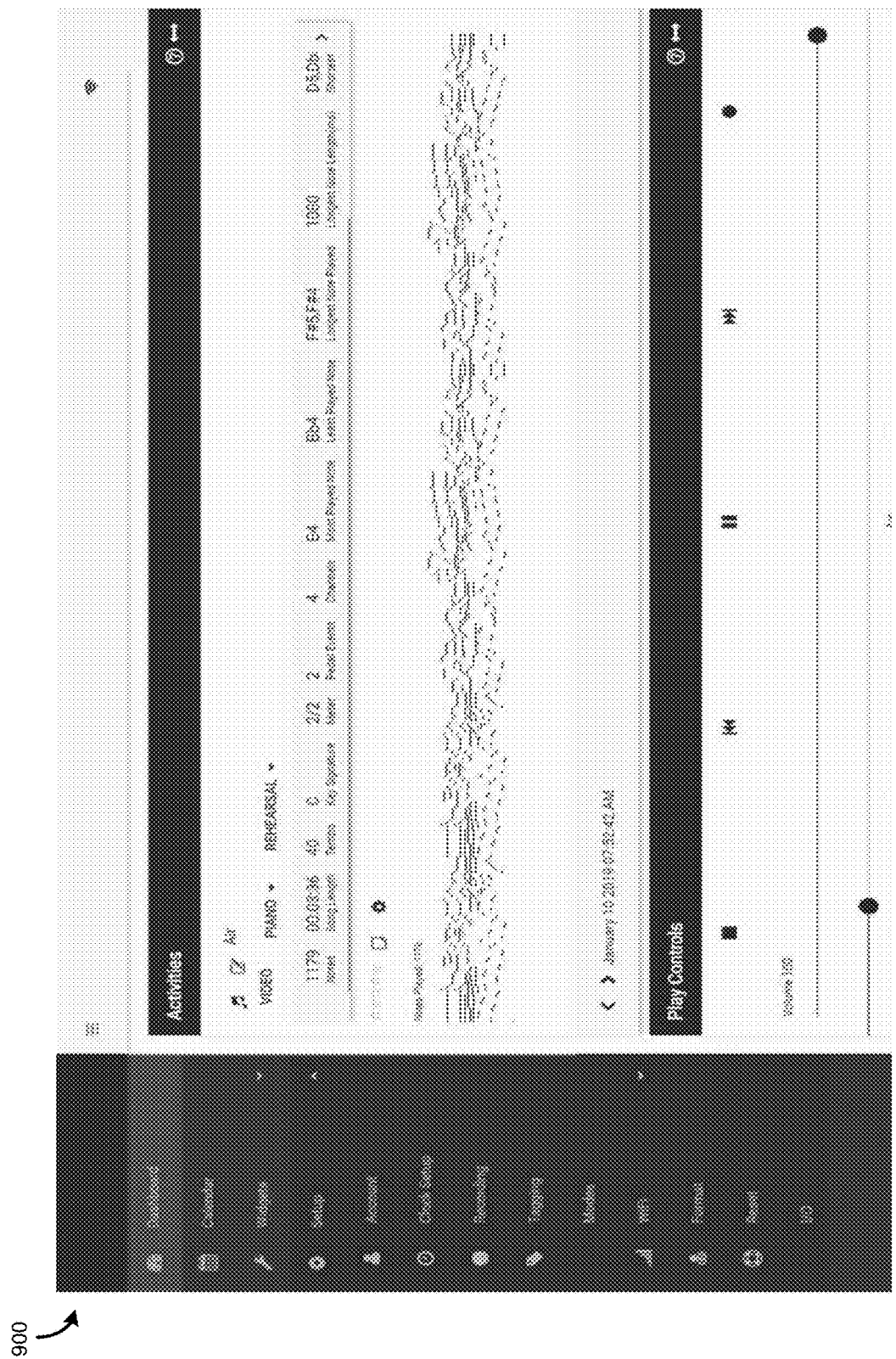
FIG. 9 illustrates another example view of a user interface that may be provided with the client device to communicate with the music controller device and computing server described relative to FIG. 1.

FIG. 9 illustrates an example of a view 900 of the GUI provided for the app 111. The view 900 depicts a view of the app 111 relating to data stored in the associated music controller device 105. Illustratively, the left-hand portion of the view 900 provides a menu displaying various items that a user may select. Upon selection, the view 900 may display the corresponding content on the right-hand portion of the view 900. For example, as illustrated in view 900, the selected item is a dashboard which is used to display various data and analytics related to performances and activity as stored on the music controller device 105. For example, the currently displayed dashboard provides an activity window showing information such as an instrument used, a type of performance (e.g., a rehearsal), title of the performance, an amount of notes played, a length of the performance, a key signature in which the performance was played, a tempo at which the piece was played, and the meter in which the piece was played. The dashboard also provides play controls to allow playback functionality for the user.

Other example menu items include a calendar for displaying times and dates at which musical data was performed and/or uploaded to the music service platform, widgets for accessing the utility tools 222 to tune various audio and MIDI settings, a setup to access configuration settings for the music controller device 105, an account item to configure music service platform settings for a user associated with the music controller device 105, a clock setup item to configure time and date settings, a recording item to access recording functions, a tagging item to allow the user to add metadata tags to a given performance, modes to configure operational modes, a Wi-Fi item to configure network accessibility, a format item to adjust user interface settings, indicating musical data and other activities being performed by the user, and reset and I/O items.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided in sub-modules, sub-processes or other units of computer code or data as may be required by a particular design or implementation of the computing device.

In the drawings, specific arrangements or orderings of elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application programming interface (API), and/or other software development tools or frameworks. Similarly, schematic elements used to represent data or information may be implemented using any suitable electronic arrangement or data structure. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
   a music controller device comprising an on-device microphone, to:
   receive a selection of one or more operational modes, the operational modes including a capture mode and a playback mode;
   upon selection of the capture mode, activate the on-device microphone;
   receive, via capture by the on-device microphone, musical data indicative of a music performance by an individual; and
   generate metadata characterizing the musical data, the metadata including a specification of at least one instrument type of a plurality of instrument types, the plurality of instrument types including a keyboard instrument type, a guitar instrument type, and a synthesizer instrument type;
   a client device comprising a software application to:
   communicate with the music controller device;
   receive the musical data and the metadata from the music controller device; and
   present a graphical user interface for display on the client device, the graphical user interface including information related to the musical data and the metadata; and
   a server to:
   receive the musical data and the metadata from either the music controller device or the client device;
   generate, based on the metadata, one or more analytics associated with the musical data; and
   perform one or more data aggregation techniques on the musical data, and
   provide a plurality of services for processing the musical data, the plurality of services including an application programming interface (API) to provide access to the musical data by one or more third-party applications.

2. The system of claim 1, wherein the musical data is received from one or more musical instruments connected with the music controller device.

3. The system of claim 1, wherein the metadata characterizing the musical data comprises one or more of an identifier of the musical performance, an identifier of a user associated with the musical data, a length of the musical data, and a type of music instrument used in creating the musical data.

4. The system of claim 1, wherein the plurality of services includes a social media service for sharing the musical data.

5. The system of claim 1, wherein the plurality of services includes an automated registration service.

6. The system of claim 1, wherein the musical data corresponds to audio input recorded by the music controller device.

7. The system of claim 1, further comprising, transmitting, by the server, the one or more analytics associated with the musical data to the client device, wherein the graphical user interface displays the one or more analytics.

8. The system of claim 1, wherein the server is further to manage a plurality of user accounts.

9. The system of claim 8, wherein the musical data is associated with one of the user accounts.

10. The system of claim 1, wherein the one or more analytics include one or more of a performance tendencies of the individual, an average length of the musical performance, and one or more patterns in the musical performance.

11. The system of claim 1, wherein the metadata includes sensor information retrieved from devices connected with the music controller device.

12. The system of claim 11, wherein the devices connected with the music controller device include one or more of a camera device, wearable device, or musical equipment.

13. The system of claim 1, wherein the music controller device is further to capture an input from one or more sensors connected with the music controller device.

* * * * *